United States Patent
Stocker et al.

(10) Patent No.: US 10,365,031 B2
(45) Date of Patent: Jul. 30, 2019

(54) COOLING AND/OR FREEZING DEVICE

(71) Applicant: Liebherr-Hausgerate Lienz GmbH, Lienz (AT)

(72) Inventors: Richard Stocker, Assling (AT); Stefan Walder, Sillian (AT)

(73) Assignee: LIEBHERR-HAUSGERÄTE LIENZ GMBH, Lienz (AT)

( * ) Notice: Subject to any disclaimer, the term of this patent is extended or adjusted under 35 U.S.C. 154(b) by 0 days.

(21) Appl. No.: 16/061,664

(22) PCT Filed: Dec. 12, 2016

(86) PCT No.: PCT/EP2016/002101
§ 371 (c)(1),
(2) Date: Jun. 13, 2018

(87) PCT Pub. No.: WO2017/102077
PCT Pub. Date: Jun. 22, 2017

(65) Prior Publication Data
US 2018/0372395 A1    Dec. 27, 2018

(30) Foreign Application Priority Data

Dec. 14, 2015  (DE) .......................... 10 2015 016 203
Jan. 15, 2016  (DE) .......................... 10 2016 000 369

(51) Int. Cl.
A47B 96/04    (2006.01)
F25D 23/02    (2006.01)
F25D 23/08    (2006.01)

(52) U.S. Cl.
CPC ......... *F25D 23/028* (2013.01); *F25D 23/087* (2013.01); *F25D 2323/021* (2013.01); *F25D 2700/02* (2013.01); *F25D 2700/04* (2013.01)

(58) Field of Classification Search
CPC ................. F25D 17/047; F25D 23/087; F25D 2323/021; F25D 2700/02
See application file for complete search history.

(56) References Cited

U.S. PATENT DOCUMENTS 2,659,115 A * 11/1953 Anderson ............. E05C 19/161
                                                                292/251.5
4,932,730 A *  6/1990 Zeismann ............. F25D 17/047
                                                                292/336.3

(Continued)

FOREIGN PATENT DOCUMENTS

WO    2006090958 A1    8/2006
WO    2006101291 A1    9/2006

OTHER PUBLICATIONS

International Search Report and Written Opinion issued in corresponding International Patent Application No. PCT/EP2016/002101 (with English translation of International Search Report) dated Mar. 21, 2017 (15 pages).

(Continued)

*Primary Examiner* — Matthew W Ing
(74) *Attorney, Agent, or Firm* — Kilyk & Bowersox, P.L.L.C.

(57) ABSTRACT

A refrigerator and/or freezer is described having at least one body that encloses at least one cooled interior space, and with at least one first and one second door opening in opposite directions, which doors are articulated to the body, wherein the interior space can be closed, wherein one or both doors include one or more seals that in the closed condition of the doors are disposed in the gap between the doors, wherein the at least one seal is in its closed end position when the doors are closed, characterized in that the appliance includes at least one door opening sensor and at least one drive unit communicating with the same, which is configured to move the at least one seal of a door away from (Continued)

the other door into an open end position, wherein the drive unit furthermore is configured such that the same is activated when the door opening sensor detects the opening of a door or the touching of the door by a user.

12 Claims, 1 Drawing Sheet

(56) References Cited

U.S. PATENT DOCUMENTS

| | | | | | |
|---|---|---|---|---|---|
| 5,573,323 | A | * | 11/1996 | Kim | F25D 17/047 312/405 |
| 6,375,291 | B1 | * | 4/2002 | Nam | E05B 17/0033 16/412 |
| 2006/0021284 | A1 | * | 2/2006 | Benz | F25D 17/047 49/477.1 |
| 2008/0231158 | A1 | * | 9/2008 | Keller | F25D 17/047 312/405 |
| 2009/0179540 | A1 | * | 7/2009 | Seo | E05B 17/0033 312/405 |
| 2012/0262047 | A1 | * | 10/2012 | Stocker | F25D 23/087 312/405 |

OTHER PUBLICATIONS

Search Report issued in corresponding German Patent Application No.10 2016 000 369.3 dated Sep. 15, 2016 (7 pages).

* cited by examiner

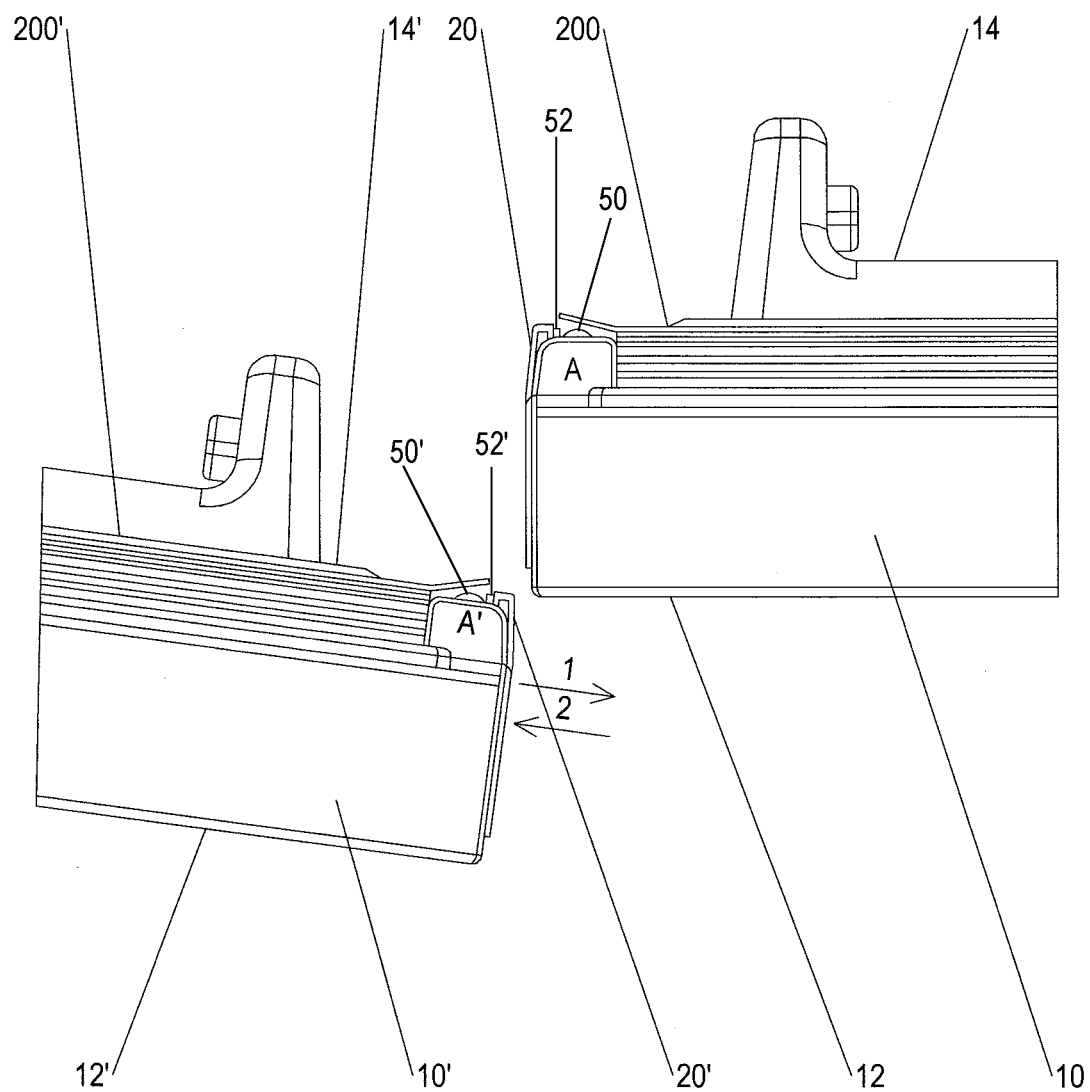

COOLING AND/OR FREEZING DEVICE

This application is a National Stage Application of PCT/EP2016/002101, field Dec. 12, 2016, which claims priority to German Patent Application No. 10 2016 000 369.3 field Jan. 15, 2016, and German Patent Application No. 10 2015 016 203.9,filed Dec. 14, 2015.

The present invention relates to a refrigerator and/or freezer with at least one body that encloses at least one cooled interior space, and with at least one first and one second door opening in opposite directions, which doors are articulated to the body, by means of which doors the interior space can be closed, wherein one or both doors include one or more seals that in the closed condition of the doors are disposed in the region between the doors, wherein the at least one seal is in its closed end position when the doors are closed.

Such refrigerators and/or freezers are known as so-called French-door appliances. In these appliances seals do exist not only between the doors of the appliance and the appliance body, but also in the region between the two doors opening in opposite directions, so that this region can also be sealed against the ingress of heat and moisture into the cooled interior space.

In the closed condition of both doors, the one or more seals disposed between the doors rest against each other such that the desired sealing function between the doors is achieved and thus a heat input into the cooled interior space between the doors is prevented largely or completely.

In such a sealing arrangement it is problematic that the at least one seal must be arranged in a defined opening position or end position when a door is opened or closed, in order to prevent a collision of this seal with the seal of the other door or with the other door itself.

It is known from the prior art to realize a defined opening position, i.e. a defined open end position of the seals, by using magnets or spring elements in order to prevent a collision on closing and opening of the door. A disadvantage of this arrangement consists in that the same is comparatively sensitive to tolerances, such as gap sizes, spring forces and magnetic forces. In addition, a heating integrated into the seal can hinder the movement or the required stroke of the seal.

Conceivable error cases consist in that with too small a gap size or improperly fitting seal the seal collides with the counter-door, which results in the fact that the respective door cannot be closed completely.

When the seals mounted in the two doors have a certain magnetic pole orientation, the same can have a negative effect on the closing behavior shortly before the closed end position to the effect that one door remains open e.g. by few millimeters. This can easily be overlooked e.g. when using a closing aid, which results in the fact that ambient air is introduced into the appliance.

When the gap sizes are chosen too large or when the magnetic forces exerted by the magnets present in the seals are too low, the seal possibly can remain open, i.e. the gap is not sealed completely, which in turn can lead to an introduction of ambient air into the cooled interior space.

Therefore, it is the object underlying the present invention to develop a refrigerator and/or freezer as mentioned above to the effect that the movement of the seal is effected reliably.

This means that a collision of the seal with components of the counter-door, i.e. the closed door, is prevented on closing and opening of the door and that—as soon as the door is closed—a proper and reliable sealing is ensured.

This object is solved by a refrigerator and/or freezer with the features of claim 1.

Accordingly, it is provided that the appliance includes at least one door opening sensor and at least one drive unit communicating with the same, which is configured to move the at least one seal of the door away from the other door proceeding from the closed end position of the seal into an open end position of the seal, wherein the drive unit furthermore is configured such that the same is activated and thus moves the seal when the door opening sensor detects the opening of a door or the touching of the door by a user, i.e. the opening intent.

The term "end position" is understood to be any position of the seal and not necessarily the maximum deflection of the seal. The open end position of the seal is a position of the seal in which the same has a smaller distance to its counter-surface than in the closed end position.

This drive unit with one or more seals movable by the same can be provided in one door or also in both doors.

It is conceivable that in the appliance at least one electronic unit or at least one control or regulation unit is provided, which receives the signal of the door opening sensor and depending on the signal actuates the drive unit in the desired way. By the present invention it is ensured that the seal of at least one door is moved away from the seal or other counter-surface of the other door, i.e. a gap deliberately is produced between the doors in order to provide for an unimpeded opening of a door.

The drive unit can be formed e.g. by a servo motor, such as for example a servo drive as it is known from model making.

In principle, arbitrary drive units are conceivable, such as for example an electric motor or also a pneumatic, hydraulic or electromagnetic drive unit.

The invention comprises both the case that the drive unit of that door is activated, which is opened or is to be opened, and the case that the drive unit of the other door, i.e. the closed door which is not to be opened, is activated. It is decisive that the at least one seal is removed from its counter-surface against which it rests in the closed condition of both doors.

The invention also comprises the case that the drive units of both doors are activated when a corresponding sensor signal is detected, which indicates that a door is opened or is to be opened.

In principle, both of the doors can be equipped with such a drive unit, or also only one door.

In a further aspect of the invention it is provided that the door opening sensor is a door ajar switch or also a touch sensor. When a door ajar switch is provided, the same detects that the door no longer is in its closed position and then directly or via a control or regulation unit activates the at least one drive unit that retracts one or both seals of the doors, which are disposed between the doors.

The doors each can include one or more seals arranged between the doors. Furthermore, the doors each can include one or more drive units for moving the at least one seal.

The sensor also can be a touch sensor that is arranged at an arbitrary point of the door or also at another point of the appliance. What is conceivable, for example, is the integration or arrangement of a touch sensor at the door handle. When the door handle is touched, this is recognized by the touch sensor. Then, one or more seals are retracted by the drive unit, so that the gap between the doors is increased and an unimpeded opening of the at least one door is possible.

Preferably, a separate door opening sensor is associated with each of the doors or each of the doors has its own door opening sensor.

The drive unit can move the seal into a defined open end position directly or also via a mechanism. This mechanism 52 or 52' in the FIGURE, for example can include an eccentric and/or a spring, which each suitably act on the seal or communicate with the same.

In a further aspect of the invention it is provided that the drive unit is configured or actuated such that the same holds the seal in the open end position as long as the door is open. In this case, the open end position is maintained until the door is closed again. After the complete closing of the door, the door opening sensor detects the closed condition and the renewed movement of the seal into the closed end position is enabled or effected. The seal then again moves into its closed end position and thus ensures a proper sealing in the transition region between the doors.

This return movement of the seal can likewise be performed by the drive unit or also by another element, such as for example a spring or the like.

By the present invention the advantages are achieved that there is no risk of collision due to an undefined position of the seal on closing of the door or counter-door. When the seal is held in its open end position as long as a door is open, no collision with the counter-door can occur.

Due to the sufficient distance to the counter-surface, i.e. to the surface on which the door seal rests against the other door, the magnetic polarity of the door seal has no effect on the closing behavior. The counter-surface can be a further seal or also only a side face of the door itself.

The invention also comprises the case that the respective seal or seals are configured as magnetic door seals. However, the invention also comprises the case that the use of magnets in the seal or in the seals is omitted.

A further advantage of the invention consists in that the sealing stroke in itself, i.e. without taking account of the deflection of the mechanism, can be reduced to a necessary minimum, which has a positive effect on the wear of the seal.

Gap sizes in the doors have no influence, as the drive deflects or retracts the seal such that always a sufficient total stroke is ensured. This can be ensured for example by using one or more spring elements that cover the variance of the door gap and thereby ensure that the drive always moves the at least one seal into its end position and need not be designed for different gap sizes, which has a positive effect as regards the costs.

By selectively releasing or retracting at least one of the seals it can be ensured that when opening one door, the other door remains closed and is not pulled along. As already explained above, the configuration of the sealing concept with drive unit according to the invention can be arranged on both doors, but can also be limited however to only one door.

When the drive unit and the movable seal are disposed on only one door, it can be provided that the heating of the sealing region is effected on the other side of the seal, i.e. on the side and on the door designed without a movable seal. Due to the lack of complexity, sufficient room is available for a heating device on this side.

As already explained above, the drive unit for example is of the pneumatic, hydraulic, electromotive or electromagnetic type or is formed by a combination of these drive technologies.

Further details and advantages of the invention will be explained in detail with reference to an exemplary embodiment described below.

The only FIGURE shows the mutually facing portion of two doors of a French-door appliance.

The exemplary embodiment relates to a French-door appliance that includes two doors which can be opened in opposite directions. With their one side region, the doors each are articulated to the appliance body by hinges or bearings etc. On the other side of the doors seals are disposed, which seal the gap between the doors.

The only FIGURE by way of example shows a cross-sectional view of the region of the two doors 10, 10' in which the same rest against each other in the closed condition. In the FIGURE, the door 10' shown on the left is slightly open.

The doors each consist of an outer door or of an outer region 12, 12', which for example can be designed as a metal sheet, and of an inner door or an inner region 14, 14', which for example can be made of plastic material. As can be taken from the FIGURE, webs are located on this inner region, to which one or more door shelves can be attached.

The reference numeral 200, 200' in the FIGURE designates door seals which can be magnetic or non-magnetic door seals by means of which the doors sealingly rest against a counter-surface of the body.

In the regions of the doors 10, 10' facing each other, i.e. in the region of the vertically extending narrow door sides facing each other, the same are provided with seals 20, 20' that perform a sealing between the doors when both doors 10, 10' are closed.

Reference numeral A, A' each designates an arbitrary drive unit which for example can be configured as a servo motor or electric motor and which has the task to move the seal 20, 20' away from the respective door (direction of arrow 1) or to move it towards the door (direction of arrow 2).

On the body of the appliance or also on the door at least one door ajar switch (or door opening sensor) is disposed 50 and 50'.

This door ajar switch detects whether or not the door is open.

In the example shown in the FIGURE the left door 10' is open, which is detected by the corresponding door ajar switch. As soon as the door ajar switch reports the opening of the door, this signal is transmitted to the drive unit A' for example via an electronic unit or a control or regulation unit. Said drive unit then is activated and pulls the door seal 20' away from the door 10 remaining closed, so that the gap or distance between the doors 10, 10' is increased.

Thus, the door 10' can easily be opened or also be closed again without colliding with parts of the counter-door. The seal 20' then can remain in this position until the door 10' is closed again, which is detected by the door ajar switch 50 or 50'. As soon as the door 10' is closed again, the seal 20' is moved back again (according to the direction of arrow 1) and then again sealingly rests against the counter-surface of the door 10.

This counter-surface likewise can represent a seal 20 or also simply only the front side or narrow side of the door 10 without seal.

By the present invention, a reliable movement of the door seal is achieved. As explained, the drive of the door seal preferably is effected electromechanically, i.e. for example by an electric motor or servo motor, which via a mechanism acts on the seal and deflects or retracts the same in the desired way.

The invention claimed is:

1. A refrigeration unit which is a refrigerator, a freezer or a refrigerator-freezer-combination, the refrigeration unit having:

a body that encloses an interior space;
a first door and a second door hinged to the body and opening in opposite directions, the first door and the second door covering an opening to the interior space;
a first seal mounted to the first door such that when the doors are closed the first seal protrudes into a gap between the doors, thereby assuming a closed position relative to the first door;
a first door opening sensor; and
a first drive unit communicating with the first door opening sensor;
wherein the first drive unit is configured to withdraw, when activated, the first seal from the closed position into an open position relative to the second door, where the first seal is further removed from the second door and retracted towards the first door;
wherein the first drive unit communicates with the first seal via a mechanism comprising an eccentric; and
wherein the first drive unit is configured to be activated if the first door opening sensor detects that a first door is opened or that the first door is touched by a user.

2. The refrigeration unit according to claim 1, wherein the first drive unit is configured as an electric motor or as a pneumatic, hydraulic or electromagnetic drive unit.

3. The refrigeration unit according to claim 1, wherein the first door opening sensor is a door ajar switch or a touch sensor.

4. The refrigeration unit according to claim 1, wherein the first drive unit is configured to hold the first seal in the open position as long as the first door is detected to be open.

5. The refrigeration unit according to claim 1, wherein the first drive unit is configured to return the first seal into the closed position only if the first door is detected to be closed.

6. The refrigeration unit according to claim 1, wherein the first seal is a magnetic seal or is a seal without magnets.

7. The refrigeration unit according to claim 1, further comprising a second seal mounted to the second door such that when the doors are closed the second seal protrudes into the gap between the doors, thereby assuming a closed position relative to the second door;
a second door opening sensor; and
a second drive unit communicating with the second door opening sensor;
wherein the second drive unit is configured to withdraw, when activated, the second seal from its closed position into an open position relative to the second door, where the second seal is further removed from the first door and retracted towards the second door;
wherein the second drive unit communicates with the second seal via a mechanism comprising an eccentric; and
wherein the second drive unit is configured to be activated if the second door opening sensor detects that the second door is opened or that the appliance is touched by a user.

8. The refrigeration unit according to claim 7, wherein the second drive unit is configured as an electric motor or as a pneumatic, hydraulic or electromagnetic drive unit.

9. The refrigeration unit according to claim 7, wherein the second door opening sensor is a door ajar switch or a touch sensor.

10. The refrigeration unit according to claim 7, wherein the second drive unit is configured to hold the second seal in its open position as long as the second door is detected to be open.

11. The refrigeration unit according to claim 7, wherein the second drive unit is configured to return the second seal into its closed position only if the second door is detected to be closed.

12. The refrigeration unit according to claim 7, wherein the second seal is a magnetic seal or is a seal without magnets.

* * * * *